United States Patent
Grunberg et al.

(10) Patent No.: US 11,194,668 B1
(45) Date of Patent: Dec. 7, 2021

(54) BACKUP ACROSS REDUNDANT REMOVABLE MEDIA

(71) Applicants: Daniel Backer Grunberg, Lexington, MA (US); Theodore Wu Grunberg, Lexington, MA (US)

(72) Inventors: Daniel Backer Grunberg, Lexington, MA (US); Theodore Wu Grunberg, Lexington, MA (US)

(*) Notice: Subject to any disclaimer, the term of this patent is extended or adjusted under 35 U.S.C. 154(b) by 135 days.

(21) Appl. No.: 16/257,331

(22) Filed: Jan. 25, 2019

Related U.S. Application Data

(60) Provisional application No. 62/623,188, filed on Jan. 29, 2018.

(51) Int. Cl.
*G06F 11/14* (2006.01)
*G06F 16/13* (2019.01)
*G06F 16/11* (2019.01)

(52) U.S. Cl.
CPC ...... *G06F 11/1451* (2013.01); *G06F 11/1453* (2013.01); *G06F 11/1456* (2013.01); *G06F 11/1469* (2013.01); *G06F 16/122* (2019.01); *G06F 16/137* (2019.01)

(58) Field of Classification Search
CPC .. G06F 11/1451; G06F 16/122; G06F 16/137; G06F 11/1453; G06F 11/1456; G06F 11/1469
USPC ...................................................... 707/646
See application file for complete search history.

(56) References Cited

U.S. PATENT DOCUMENTS

| | | | | |
|---|---|---|---|---|
| 5,485,474 | A | 1/1996 | Rabin | .................. 371/37.1 |
| 8,762,507 | B1* | 6/2014 | Ingram | ............. H04L 41/28 |
| | | | | 709/223 |
| 8,788,913 | B1* | 7/2014 | Xin | ................ H03M 13/373 |
| | | | | 714/776 |
| 2008/0250085 | A1* | 10/2008 | Gray | ............... G06F 11/1453 |
| 2010/0042609 | A1* | 2/2010 | Wu | ............... G06F 16/24575 |
| | | | | 707/749 |
| 2013/0185802 | A1* | 7/2013 | Tibeica | ........... H04L 63/1483 |
| | | | | 726/26 |

(Continued)

OTHER PUBLICATIONS

AskUbuntu, "Remove file but exclude all files in a list" 2016, https://askubuntu.com/questions/830776/remove-file-but-exclude-all-files-in-a-list (Year: 2016).*

(Continued)

*Primary Examiner* — Alford W Kindred
*Assistant Examiner* — Allen S Lin
(74) *Attorney, Agent, or Firm* — Christopher P. Maiorana, P.C.

(57) ABSTRACT

A method for backup across redundant removable media includes the steps of selecting a current portion of a database to add to a backup collection. The backup collection includes N units of the removable media. N is an integer greater than two. Generating a backup file of a current file in the database using a K-of-N coding process. K is an integer less than N. The backup file has N parts. The current file may be recovered from any K parts among the N parts. Determining if less than N−K+1 backups of the current file exist in the backup collection. Writing a subset of the current file to a current unit of the N units in response to the backup collection having less than the N−K+1 backups. Writing a current part among the N parts of the backup file to the current unit.

20 Claims, 9 Drawing Sheets

| | | 00 | 01 | 02 | 03 | 04 | 05 | 06 | 07 | 08 | 09 | 10 | 11 | 12 | 13 | 14 | 15 |
|---|---|---|---|---|---|---|---|---|---|---|---|---|---|---|---|---|---|
| 122 | DAY | | | | | | | | | 138 ↓ | | | | | | | |
| 124 | BACKUP | BA | BA | BA | BA | BA | BA | BB | BB | BB | BB | BB | BB | BC | BC | BC | BC |
| 126 | CYCLE | CA | CB | CC | CD | CE | CF | CA | CB | CC | CD | CE | CF | CA | CB | CC | CD |
| 128 | PART | FA | FB | FC | FD | FE | FF | FA | FB | FC | FD | FE | FF | FA | FB | FC | FD |
| 130 | OLD | P | P | P | P | P | P | P | P | P | P | P | P | P | P | P | P |
| 132 | NEWA | | | | | | | Q | R | S | | | | | | | |
| 134 | NEWB | | | | | | | Q | R | S | | | | | | | |
| 136 | NEWC | | | | | | | Q | R | S | | | | | | | |

120

(56) References Cited

U.S. PATENT DOCUMENTS

| | | | |
|---|---|---|---|
| 2017/0060469 A1* | 3/2017 | Luby | G06F 3/0689 |
| 2017/0308420 A1* | 10/2017 | Korotaev | G06F 11/0763 |
| 2018/0060169 A1* | 3/2018 | Hussain | G06F 11/1076 |
| 2018/0232284 A1* | 8/2018 | Tormasov | G06F 11/1662 |

OTHER PUBLICATIONS

Unix and Linux, "Delete all files except in a certain subdirectory with find", Aug. 18, 2013, https://unix.stackexchange.com/questions/87258/delete-all-files-except-in-a-certain-subdirectory-with-find (Year: 2013).*

Michael O. Rabin, "Efficient Dispersal of Information for Security, Load Balancing, and Fault Tolerance", Journal of the Association for Computer Machinery, 1989, vol. 36 No. 2 pp. 335-348.

James S. Plank, "A New MDS Erasure Code for RAID-6", Department of Electrical Engineering and Computer Science, University of Tennessee, Sep. 2007.

James Westall et al., "An Introduction to Galois Fields and Reed-Solomon Coding", School of Computing, Clemson University, Clemson, South Carolina, Oct. 4, 2010.

* cited by examiner

BACKUP ACROSS REDUNDANT REMOVABLE MEDIA

This application relates to U.S. Provisional Application No. 62/623,188, filed Jan. 29, 2018, which is hereby incorporated by reference in its entirety.

FIELD OF THE INVENTION

The invention relates to backing up data generally and, more particularly, to a method and/or apparatus for implementing a backup across redundant removable media.

BACKGROUND

Organizations backing up large data servers face a situation where a full backup does not fit on a single device. The common time to complete a full backup is also excessive. Conventional online backup solutions are not appropriate in cases of large data sets or changes. For example, a 150 million bits-per-second upload bandwidth can only send about 1600 gigabits per day. For a 32-terabyte server, the daily bandwidth is only 5% of the total server capacity.

It would be desirable to implement a backup across redundant removable media.

SUMMARY

The invention concerns a method for backup across redundant removable media including the steps of selecting a current portion of a database to add to a backup collection. The backup collection includes N units of the removable media. N is an integer greater than two. Generating a backup file of a current file in the database using a K-of-N coding process. K is an integer less than N. The backup file has N parts. The current file may be recovered from any K parts among the N parts. Determining if less than N−K+1 backups of the current file exist in the backup collection. Writing a subset of the current file to a current unit of the N units in response to the backup collection having less than the N−K+1 backups. Writing a current part among the N parts of the backup file to the current unit.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing a backup across redundant removable media that may (i) provide for full backup of a database, (ii) provide incremental backups of the database, (iii) use removable media that can be moved to and stored in a safe location, (iv) backup a small portion of the database in each cycle, (iv) enable a full recovery of the database from a subset of the removable media, (v) be tolerant of media failures, (vi) be tolerant of a loss of some media and/or (vii) rapidly back up files added to and/or modified in the database.

Various embodiments of the invention generally provide a technique for periodically backing up a large database (or data set) using multiple cycles of smaller backups of portions of the database. A size of the database may run from approximately a few terabyte (e.g., 1 TB) to hundreds of terabyte (e.g., 500 TB). A backup copy of the database may be created and stored on a number (e.g., N) units (or sets) of a removable media.

Each backup period may be divided into multiple backup cycles (e.g., N cycles). Each cycle may back up a portion (e.g., 1/Nth) of the database such that the entire database is considered in each period. During each cycle, the portion (or fraction) of the database may be backed up to a unit of removable media. In some embodiments, a cycle may be a day or a few days. Other cycle times may be implemented to meet the design criteria of a particular application.

Figure 1:
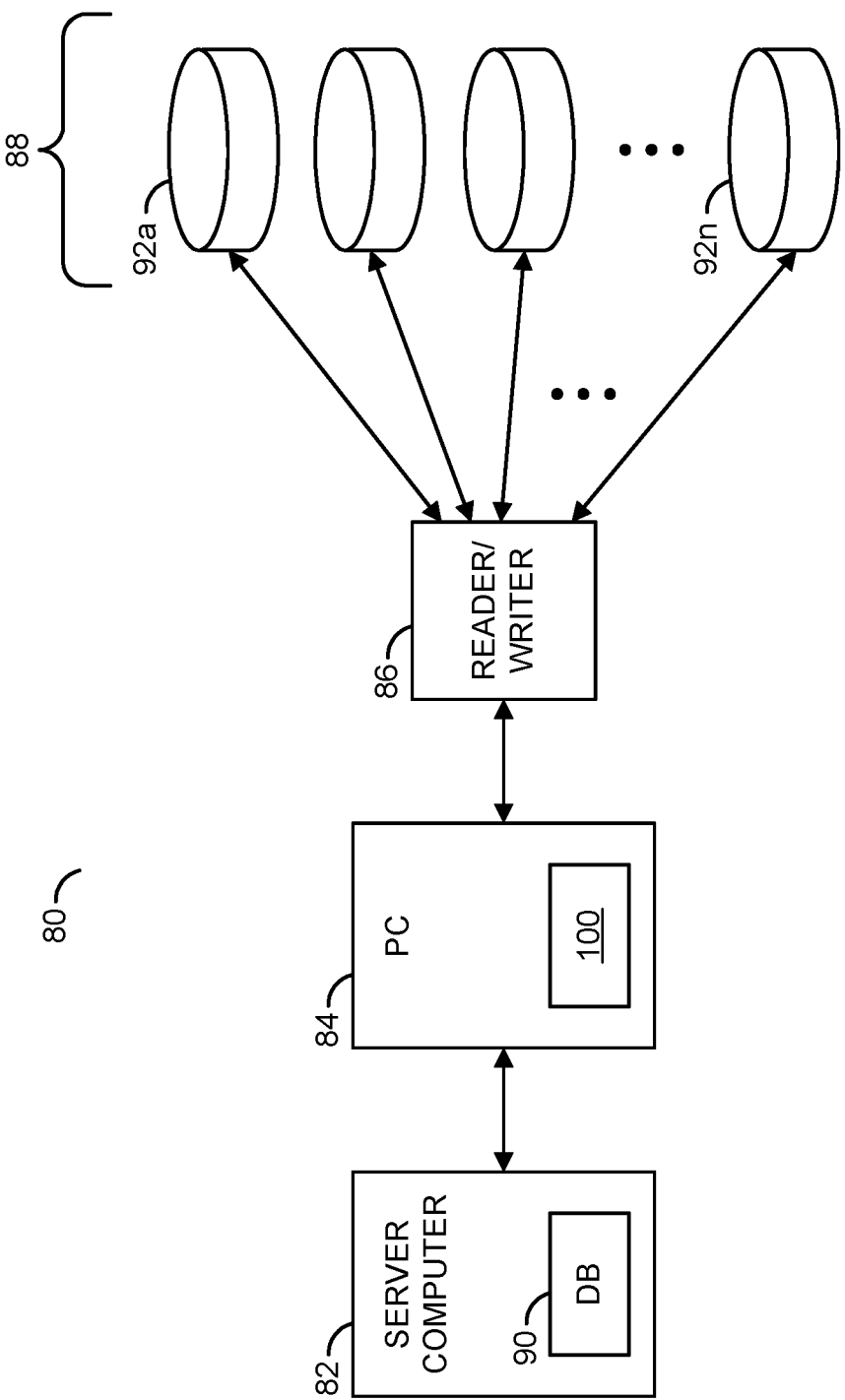
FIG. 1 is a block diagram of a system illustrating a context of the invention.

In some embodiments, each unit of the removable media may be a single device (e.g., a magnetic disk, an optical disk or a magnetic tape). In other embodiments, each unit of the removable media may be multiple devices (e.g., multiple magnetic disks, multiple optical disks and/or multiple magnetic tapes). Common magnetic disks are generally available with capacities of approximately 1 TB to approximately 8 TB. Tapes, such as an LTO-6 tape, may store approximately 2.5 TB each. An LTO-7 tape may store approximately 6 TB of data. Some large optical disks may each store approximately 0.3 TB to approximately 1 TB of data. The technique may also be applied to an online (or cloud-based) backup strategy. Each media unit may be uploaded to a different cloud location for redundancy Referring to FIG. 1, a block diagram of a system 80 is shown illustrating a context of the invention. The system (or apparatus) 80 generally comprises a block (or circuit) 82, a block (or circuit) 84, a block (or circuit) 86 and a block (or circuit) 88. The circuit 82 may include a block (or circuit) 90. The circuit 88 may include multiple blocks (or circuits) 92a-92n. The circuit 84 may include a block (or circuit) 100. The circuits 82-100 may be implemented as hardware and/or software executing on the hardware.

The circuit 82 may implement one or more server computers. In some embodiments, the server computer 82 may be a personal computer, a workstation computer or a cloud-based computer. The server computer 82 is generally operational to host a database. The server computer 82 may be in bidirectional communication with the circuit 84 to send data to and from the database.

The circuit 84 may implement a computer. In some embodiments, the computer 84 may be a personal computer, a workstation computer or a cloud-based computer. The computer 84 is generally operational to generate a backup collection of the data in the database of the server computer 82. The backup collection may be transferred to the circuit 86 in a number (e.g., N) of cycles. Each cycle may transfer a portion less than all of the database. The computer 84 may also be operational to restore all or a portion less than all of the database using data received from the circuit 86.

The circuit 86 may implement a media reader/writer device (or read/write device for short). The read/write device 86 is generally operational to write the backup data to the circuits 92a-92n to create the backup collection. The read/write device 86 may also be operational to read data from the circuits 92a-92n to recover some or all of the database. In various embodiments, the read/write device 86 may be two devices, one device for reading and another device for writing.

The circuit 88 may form the backup collection of the database. The backup collection 88 is generally operational to store at least one full copy of the database. In various embodiments, the backup collection 88 may store greater than a complete copy of the database to allow for archiving of old files.

The circuit 90 may implement the database. The database 90 is generally operational to store and present data to the computer 84 and other circuitry that relies on the data. The database 90 may comprise one or more re-writable storage media. In various embodiments, the database 90 may be stored in a RAID configuration. The database 90 may include, but is not limited to, file servers, network attached storage (NAS), and any other collection of files, possibly organized into directories and/or subdirectories.

Each circuit 92a-92n may implement one or more removable media units. Each media unit 92a-92n may comprise one or more devices to achieve a desired storage capacity per unit. A corresponding media unit 92a-92n may be provided for each cycle of the backup period. In some embodiments, a greater number of media units 92a-92n may be provided than the total number of cycles of the backup period.

The circuit 100 may implement a backup circuit. The backup circuit 100 may include a combination of hardware and software components executing on the hardware, and configured to generate the backup collection 88 from the database 90. In various embodiments, the backup circuit 100 may be configured to select a current portion less than all of the database 90 to add to the backup collection 88, where the backup collection 88 comprises N units 92a-92n of removable media and N is an integer greater than two. The backup circuit 100 may generate a backup file of a current file in the portion of the database 90 using a K-of-N coding process, where K is an integer less than N, the backup file has N parts and the current file can be recovered from any K parts among the N parts of the backup file. The backup circuit 100 may also determine if less than N−K+1 backups of the current file (and/or less than K−1 parts of the backup file) exist in the backup collection. The backup circuit 100 may include an interface to the read/write device 86. The interface may be configured to send commands to the read/write device 86 to write a subset of the current file to a current unit (e.g., 92c) of the N units 92a-92n of the backup collection 88 in response to the backup collection 88 having less than the N−K+1 backups of the current file, and write a current part among the N parts of the backup file to the current unit of the backup collection 88. In various embodiments, the circuit 100 and the database 90 may be in different computers.

In other embodiments, the backup circuit 100 may be configured to select a current directory less than all of a plurality of source directories in the database 90 to add to the backup collection 88, where the backup collection 88 comprises N units 92a-92n of the redundant removable media and N is an integer greater than two. The backup circuit 100 may generate a subdirectory list 'S' of all of a plurality of subdirectories in the current directory and generate a backup file of the current file in a given one of the subdirectories using the K-of-N coding process, where K is an integer less than N, and the backup file has N parts and the current file may be recovered from any K parts among the N parts of the backup file. The backup circuit 100 may also determine if less than N−K+1 copies of the current file exist in the backup collection 88, add to an action list 'A' a first action type to copy a current part of the backup file to a current unit (e.g., 92c) of the N units 92a-92n of the backup collection 88 in response to the backup collection 88 having at least the N−K+1 copies of the current file, and add to the action list 'A' a second action type to copy the current file to the current unit of the backup collection 88 in response to the backup collection 88 having less than the N−K+1 copies of the current file. The backup circuit 100 may perform the action list 'A' to write either the current part of the backup file and/or the current file to the current unit.

The backup circuit 100 may also be operational to restore some or all of the database 90 from the backup collection 88. In an example of restoring a current file, the backup circuit 100 may be configured to copy data from at least K units of the N units 92a-92n of the backup collection 88, and restore the current file in the database 90 using the data. In some situations, data from all N media units 92a-92n of the backup collection 88 may be read and used to restore the files in the database 90.

Figure 2:
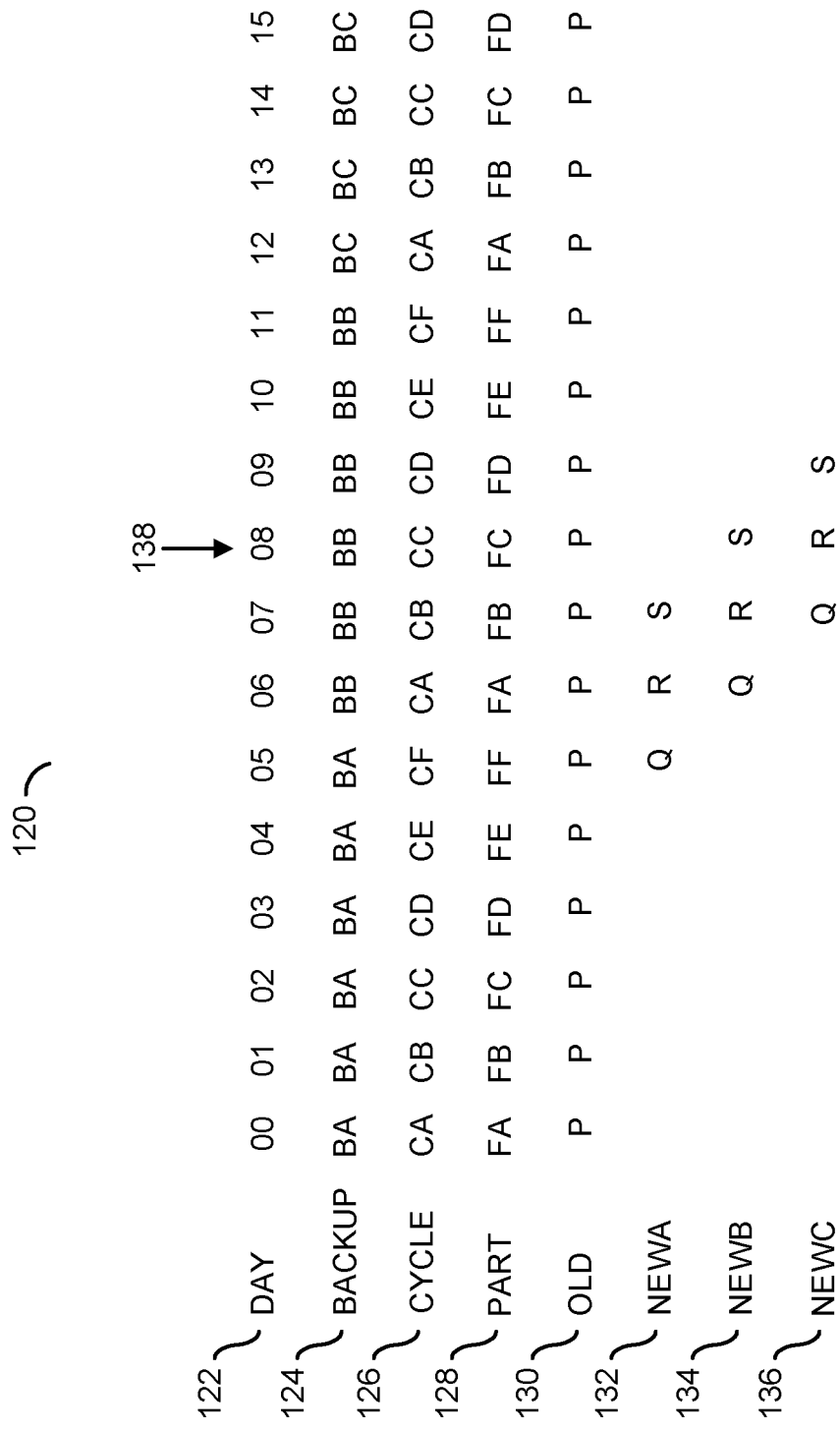
FIG. 2 is a diagram illustrating a time line for a backup in accordance with an example embodiment of the invention.

Referring to FIG. 2, a diagram illustrating a time line 120 for a backup is shown in accordance with an example embodiment of the invention. The time line 120 generally illustrates a case where K=4 and N=6. Other values of K and N, where K<N may be implemented to meet the design criteria of a particular application.

The time line 120 may illustrate a number of days 122 (e.g., day 00 to day 15). Over the course of several days 122 lasting at least a backup period 124, a full backup of the database 90 may be created. Each day 122, a media unit (e.g., 92c) may be brought in from a safe location (e.g., off-site storage). Some data may be read/written to the media unit 92c to advance the backup. Afterwards, the media unit 92c may be returned to the safe location (e.g., off-site storage). Off-site may mean a nearby secure location (such as a fireproof safe), a remote location (such as another building) and/or in cloud storage. In each day 122, another cycle 126 of the backup technique may be performed.

For a persistent (or old) 130 file (e.g., a file P) in the database 90, a different part 128 of a K-of-N coded version of the file P may be written into one of the media units 92a-92n. For example, a part FA of the file P may be added to the backup collection 88 on day 00. A part FB of the file P may be added to the backup collection 88 on day 01. A part FC of the file P may be added to the backup collection 88 on day 02, and so on. Once all parts FA-FF of the file P have been added in the backup period BA, the backup technique may begin a backup period BB on day 06. Thus, the part FA of the file P may be written again to the backup collection 88 on day 06. The part FB of the file P may be written again to the backup collection 88 on day 07, and so on.

Multiple sets of new (e.g., added and/or modified) files (e.g., Q, R and S) in the database 90 may be added to the backup collection 88 in multiple media units 92a-92n (e.g., K−1 units) on multiple consecutive days 122 (e.g., K−1 days). For example, some or all of a new file Q may be added to the backup collection 88 on days 05, 06 and 07. Corresponding parts of the K-of-N coded file Q may also be added to the backup collection 88 on the same days 05, 06 and 07. Some or all of a new file R and the corresponding parts of the K-of-N coded file R may be added to the backup collection 88 on days 06, 07 and 08. Some or all of a new file S and the corresponding parts of the K-of-N coded file S may be added to the backup collection 88 on days 07, 08 and 09. On the N−K+2nd day and beyond, the backup circuit 100 may stop writing the full files to the backup collection 88 and only write the parts 128.

In another embodiment, when an entire new file Q is written to the backup, the corresponding K-of-N parts may not be written. The K-of-N parts may be written to the backup after N−K+1 full backups have been written. This is because any disk that has the full backup allows the file to be restored. The reason to include the parts on every backup are (a) more redundancy, and (b) when re-using a backup target unit, the file Q has not changed or been removed, the "new" files (132, 134, 136) may be deleted and the new parts FF, FA, FB may be left alone. Deleting is a very efficient operation compared to writing new data.

The K-of-N coding may be performed through finite field mathematics, where a file of size S may be converted into N pieces, each of size S/K such that any K of the pieces may be sufficient to recover the entire original file. Therefore, recovery may be achieved without relying on (or in the absence of) up to N−K pieces (e.g., N−K units) of data. The K-of-N coding may sometimes be Reed-Solomon coding. Examples of the K-of-N coding are generally described in U.S. Pat. No. 5,485,474, in publication "Efficient Dispersal of Information for Security, Load Balancing, and Fault Tolerance" by M. O. Rabin (Journal of the Association for Computer Machinery, Vol. 36, no. 2, April 1989, pp 335-348), and in publication "A New MDS Erasure Code for RAID-6" by James S. Plank (University of Tennessee, September 2007), each of which are hereby incorporated by reference in their entirety.

A basic technique of the invention may write two types of data to the media units 92a-92n, the backup part (e.g., FA-FF), and the new file (e.g., Q, R and S). The backup parts generally contain the K-of-N (e.g., 4-of-6) coding for all the persistent files in the database 90. To recover files from a given day 138 (e.g., day 08), the K (e.g., 4) parts of the file P in the media units 92a-92n written on days 05, 06, 07 and 08 may be sufficient to recover the file P. For a new file S added to the database 90 on day 07 and written into the backup collection 88 on days 07 and 08, the two (<K) parts of file S, may not be sufficient to recover the file S. Therefore, some or all of the file S may be added to the backup collection 88 on the days 07 and 08. For example, the entire file S may be written into a section 132 labeled NEWA (meaning files that are new 0 days ago) in a current media unit (e.g., 92b). Since ¼th of the file Q may be actually written in the part FB on day 07, only ¾ths of the file Q may be written in the NEWA section 132. The section 134 labeled NEWB may have files that were new 1 day ago. The section 136 labeled NEWC may have the files that were new 2 days ago, and so on. Thus, the file S may be written on a media unit 92b under NEWA, on a media unit 92c under NEWB, and on a media unit 92d under NEWC, and so on.

By writing both the parts and the full/subset data of new/modified files into the backup collection 88, all files may be recovered as long as K (e.g., 4) of the last N (e.g., 6) media units 92a-92n are available. All of the files that were statically present over K (e.g., 4) of the days may be recovered through the coded parts, and any files that appeared sooner than that may be recoverable through one of the NEWA-NEWC sections. For example, on day 08 the new file Q may only have a current part written into the backup collection 88 as four parts of the file Q will have been written to K (e.g., 4) media units 92a-92n on days 05, 06, 07 and 08. Recovery of the file Q may be performed using the data from the K (e.g., 4) parts. If the media units for day 08 and/or day 07 are missing, the file Q may be recoverable through the NEWA section on the media unit 92f written on day 05, and so on. In the general case, the backup collection 88 may have N−K+1/new sections 132-136, so a new file may be written in full to the media units 92a-92n for N−K+1 days. Once K media units 92a-92n have been created, a file may be recoverable either by K parts in the /part section 128 or by one of the copies of the file in one of the /new sections 132-136 of the K media units 92a-92n.

Figure 3:
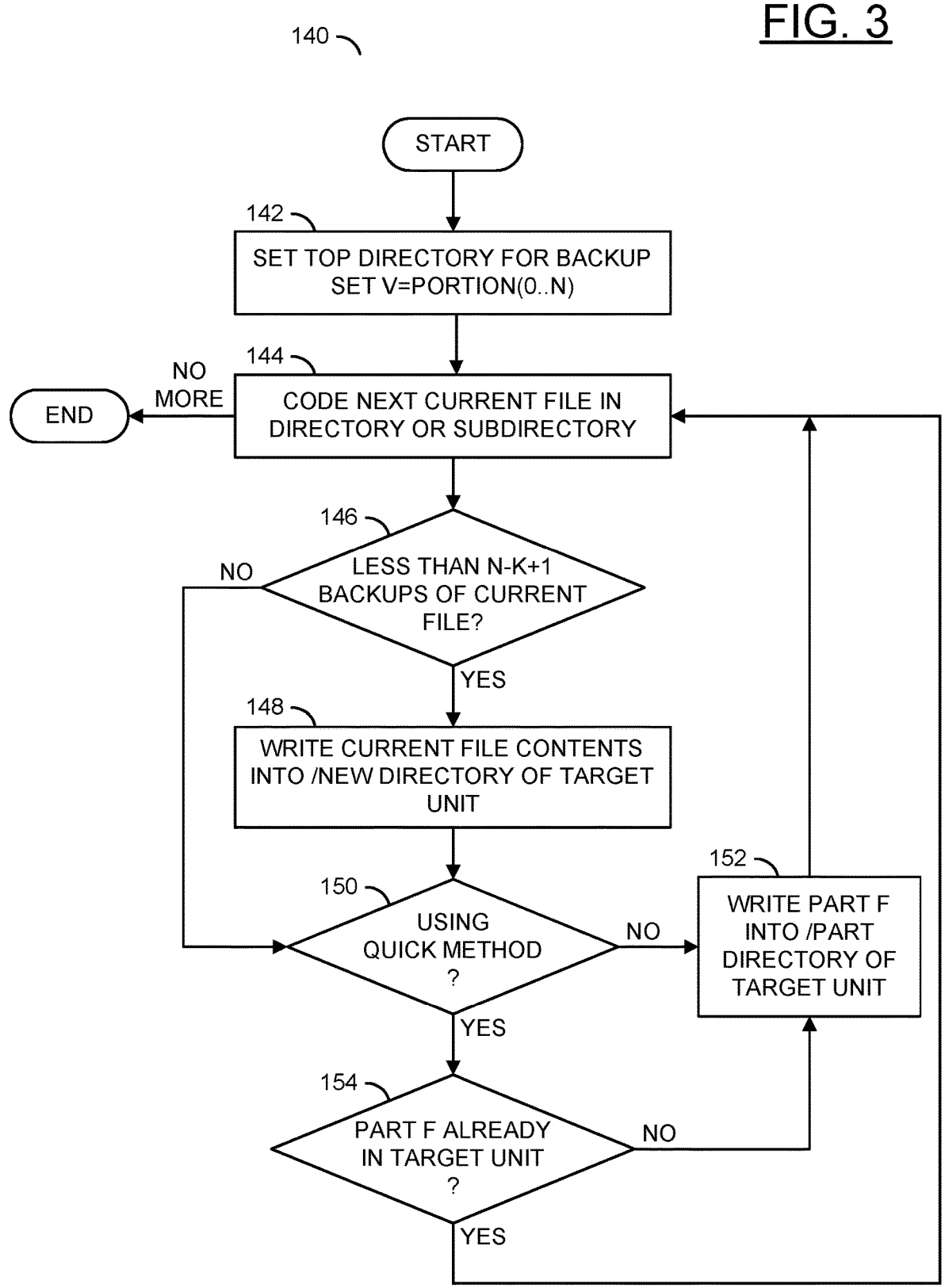
FIG. 3 is a diagram illustrating a method for generating a backup in accordance with an example embodiment of the invention.

Referring to FIG. 3, a diagram illustrating a method 140 for generating a backup is shown in accordance with an example embodiment of the invention. The method (or process) 140 may be implemented by the backup circuit 100, the read/write device 86 and the media units 92a-92n. The method 140 generally comprises a step (or state) 142, a step (or state) 144, a decision step (or state) 146, a step (or state) 148, a decision step (or state) 150, a step (or state) 152 and a decision step (or state) 154. The sequence of the steps 142 to 154 is shown as a representative example. Other step orders may be implemented to meet the design criteria of a particular application.

In the step 142, a top directory may be established for the backup and a current portion V may be set to a current portion (e.g., 0 . . . N) of the database 90 being backed up in the current cycle 128. In various embodiments, a respective number (e.g., A-N) of the media units 92a-92n may be used to determine corresponding parts (or pieces) of the current file to write under the current portion V. In the step 144, some or all of a backup file may be generated by the backup circuit 100. The backup file may be created by coding a current file in a current directory or subdirectory of the database 90 using a K-of-N coding. The resulting backup file may be viewed as having N parts.

In the decision step 146, the backup circuit 100 may determine if less than N−K+1 backups of the current file have been created in the backup collection 88. If less than N−K+1 backups already exist in the backup collection 88, the backup circuit 100 may write some to all of the current file contents into a/new subdirectory of a target (or current) media unit 92a-92n in the step 148. If at least N−K+1 backups already exist in the backup collection 88, or after the step 148 has been performed, the backup circuit 100 may check to see if a quick method is being used or not in the decision step 150.

If the quick method is not being used, the backup circuit 100 may instruct the read/write device 86 in the step 152 to write a current part F among the N parts of the backup file into a/PART directory of the target media unit 92a-92n. The current part F may be selected based on the current cycle 126 of ongoing backup period 124. The method 140 may return to the step 144 to process a next current file. Once all of the files in the current portion V have been backed up, the method 140 may end.

If the quick method is being used, the backup circuit 100 may check in the decision step 154 to see if the current part F of the backup file is already stored in the target media unit 92a-92n. If the current part F is currently stored, or after the not-currently-store part F is written in the step 152, the method 140 may return to the step 144 and select a next current file in the current portion V. If all of the files in the current portion V of the database 90 have been processed, the method 140 may end for the current cycle 126. The method 140 may start over again with a next portion V when the next cycle 126 begins.

A directory structure for the backup collection 88 may be the same as the directory structure used in the server computer 82 for the part F backups. The directory names may be modified to indicate the file portion being stored (e.g., /data/marketing/pitch.pdf_f1). A hierarchical file-like search may proceed quickly, as any files that have not changed since a previous cycle may be left alone. Deleted files may be removed. For the NEW sections 132-136, the data may be written as a single large file (or a small set of large files) to improve read and write speeds. A directory structure may be omitted for the NEW sections 132-136, as the NEW sections 132-136 may by unique to each cycle. The NEW sections 132-136 may be deleted the next time around that the corresponding media unit 92a-92n is used, and replacement NEW sections 132-136 may be written to the current media unit 92a-92n. For example, the NEWA section may contain data like [filename1] [data] [filename2] [data] ... etc. A filename compression scheme may be used to save disk space by not writing the complete path each time. A recursive listing of directories may also work well. For example, [directory] [subdir1] [files for the subdir] [subdir2] [files].

A list (or record) of the files backed up may also be kept on the server computer 82 (e.g., as part of the database 90). Entries in the list may be added, deleted and/or modified with appropriate time stamps. The list generally helps in recovery and debugging. The list may also inform an operator on what media unit 92a-92n a particular file may be found. The list may also be used to speed data transfers, as scanning the target media unit 92a-92n may be avoided since the list may identify the files already stored in the target media units 92a-92n in earlier cycles 126. The list may also contain checksum and/or cyclic redundancy check (CRC) codes for certain files in the target media unit 92a-92n (e.g., the NEW sections 132-136), so that the files may be read and verified periodically. A new set of media units 92a-92n may be used so that a complete set of backups may be put aside as a snapshot of the database 90 at a given time. Some old set of media units 92a-92n may be retained for recovery purposes until a new set has been completed.

Each time a media unit 92a-92n is inserted into the read/write device 86 in a new cycle 128, the inserted media unit 92a-92n may be sequentially numbered to a next index number available. Each file piece may contain the CRC of the original file to help verify correct reconstruction, or perhaps trying to reconstruct a file with pieces from different epochs.

To improve file snapshot in time recovery, the new files may be written to the media units 92a-92n during more than the minimum N−K+1 cycles. Any time a media unit 92a-92n is written to, an integrity of the writes may be checked by verifying the data on the media unit 92a-92n by reading the data and comparing the read data with the original data in the database 90. The NEW sections 132-126 may be verified by reading the files and either comparing the data with the same files in the database 90 (if still present), or by comparing checksums or CRC values on the entire files. The files being backed up may be stored on the target media units 92a-92n in a directory structure that matches the original structure in the database 90 (with perhaps moving the root point of the original directory to be backed up) in a manner "/part/ . . . " to store a current part among the N parts of each file on the current media unit 92a-92n, and "/new/ . . . " to store the new files on the current media unit 92a-92n.

When backing up new files and modified files, the original "/new" directory on the current media unit 92a-92n may be renamed to "/new-prev". When a newly created "/new" directory is written, the "/new-prev" directory may be deleted. The original "/new" directory may not be modified and generally has nothing in common from one iteration to the next.

A serial list of all new files recently added to the database 90 may be written into a single (large) file on the current media unit 92a-92n to increase a writing speed. During a subsequent use of the current media unit 92a-92n in a next period 124, the single file may be deleted.

In the /new directory, less than all of the data for the new files may be written. Since a 1/K part of the data for a new file may be written in the /part directory, only a fraction (e.g., (K−1)/K)) of data from each new file may be written in the /new directory. The fractional portion of each new file may be selected such that the entire new files may be recovered from the 1/K part and the (K−1)/K portion of the new files.

To determine when a file is new, a hash of a full path: size:modification time string may be used as an index into the file database 88. If each part of a backup file is identified by the hash and stored in the server computer 82, the backup circuit 100 may determine the number of parts that have been backed up in the backup collection 88. The number of parts already backed up generally determines whether the file is should be written in the /new section or not. A hash is a method for generating a number from a string in a "random" manner. Hashes such as MD5, SHA256, etc. may be used. For example, if a file changes modification time and keeps the same size, the file may be considered a new file as previously backed up parts of a file cannot be used to reconstruct the file. A CRC or hash of the file contents may also be used to index into the database 90 or to determine if a file has changed.

Figure 4:
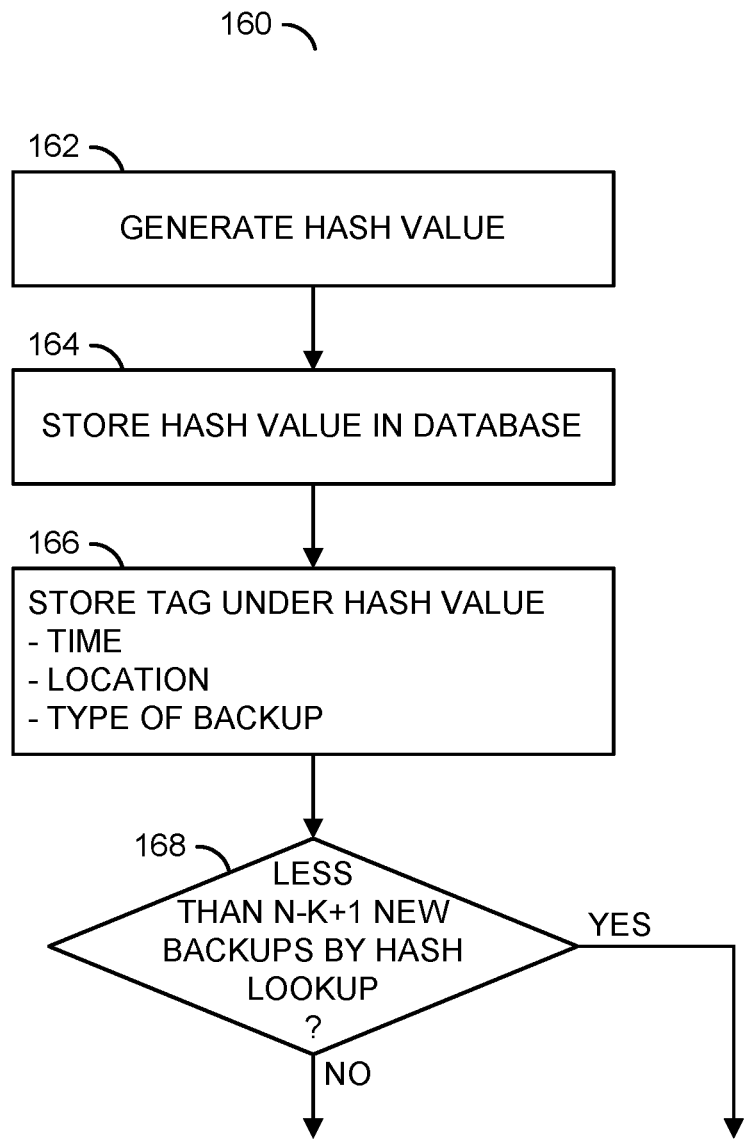
FIG. 4 is a diagram illustrating a method for tracking part backups in accordance with an example embodiment of the invention.
Figure 7:
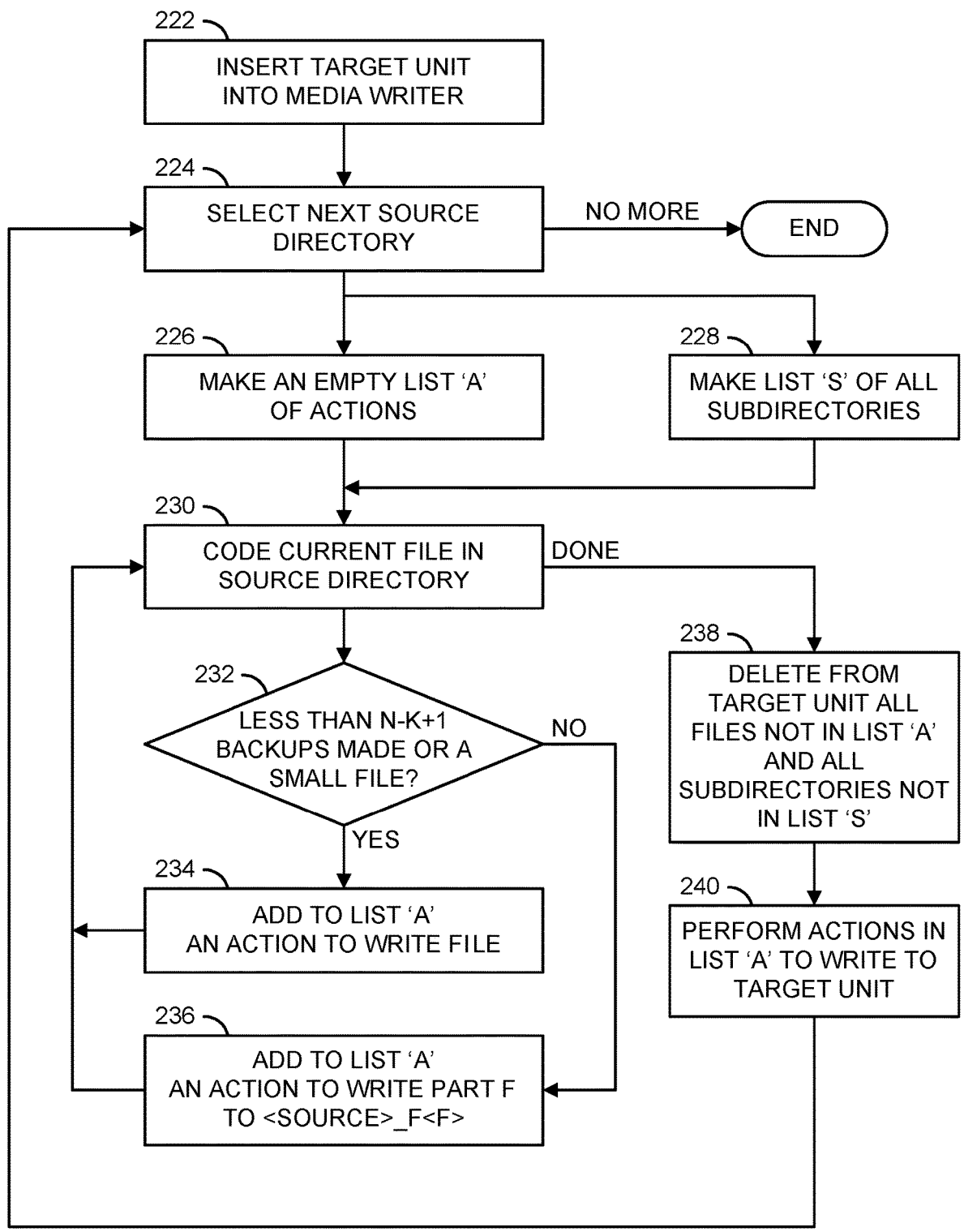
FIG. 7 is a diagram illustrating a method for generating another backup in accordance with an example embodiment of the invention.

Referring to FIG. 4, a diagram illustrating a method 160 for tracking part backups is shown in accordance with an example embodiment of the invention. The method (or process) 160 may be implemented by the backup circuit 100, the computer 84 and the server computer 82. The method 160 generally comprises a step (or state) 162, a step (or state) 164, a step (or state) 166 and a decision step (or state) 168. The sequence of the steps 162 to 168 is shown as a representative example. Other step orders may be implemented to meet the design criteria of a particular application. The method 160 may be an implementation as part of the method 140 (FIG. 3) and/or a method 220 (FIG. 7).

In the step 162, a hash value of the current file may be generated by the backup circuit 100. The hash value may be stored in a list (or record) in the server computer 82 or the computer 84 in the step 164. In some embodiments, the list may be held within the database 90 or in another memory in the server computer 82. In other embodiments, the list may be held in a memory in the computer 84.

In the step 166, the backup circuit 100 may generate a tag for the current file and/or a current part of the current file being added to the backup collection 88. The tags may include, but are not limited to, a current time, a location (e.g., directory or subdirectory), a type of backup (e.g., the full file, a subset less than all of the file, one of the N parts of the backup version of the file) and/or any combination thereof. The tags may be stored under the corresponding hash values. In the decision step 168, the backup circuit 100 may access the list and count the number of tags associated with the part types of backups under the hash value. The tags may be used to determine if less than N−K+1 new backups exist in the backup collection 88 per the hash tag lookup. The yes/no decision reached in the decision step 168 may be the yes/no decision reached in the decision step 146 of the method 140 and/or the decision step 232 in the method 220.

An additional feature that may be implemented by the backup circuit 100 is a de-duplication feature. A hash of file contents may be stored in the list. If a given file matches another file that has already been backed up for size and hash of contents, the given file may be flagged as a duplicate. A symbolic link of the target media units 92a-92n may be entered that points to an initial copy of the file. When the file is being restored, the link may be followed to find the initial copy. Often, many copies of the same file may be stored across an enterprise file server. Therefore, a user option may set whether filenames should be used as an additional check on same file contents.

In some embodiments, the /part directory and /new directory may be merged to store the files. Thus the merged directory may have a combination of new full files (or the (K−1)/K portions of the files) and the part files. For example, a full file "presentation.pdf" and a file part "presentation-.pdf_f1" may be stored in the same merged directory in one of the media units 92a-92n. The full file "presentation.pdf" may be deleted on a next backup to the same media unit 92a-92n if the file has not changed from the previous backup period 124.

A further feature may be to delay writing the part portion of a file until the file is no longer "new". For example, if a file is new (less than N−K+1 copies exist in the backup collection 88), just the file may be written to the target directory of a current media unit 92a-92n in a current cycle 126. Once N−K+1 copies of the file exist in the backup collection 88, the new file may be deleted on the current target media unit 92a-92n (if already present from an earlier cycle 126) and write the current part of the backup version of the file in the current media unit 92a-92n. The feature generally has all the same properties as the basic technique with some savings. The feature may save writing two distinct files to the current target media unit 92a-92n for a new file. The feature may also save doing the finite-field math calculations until the new file is persistent enough (survives for N−K+1 cycles 126). For each transient file that does not last N−K+1 cycles 126, the finite-field math calculations may be avoided and copying the various parts to the media units 92a-92n may also be avoided.

Figure 5:
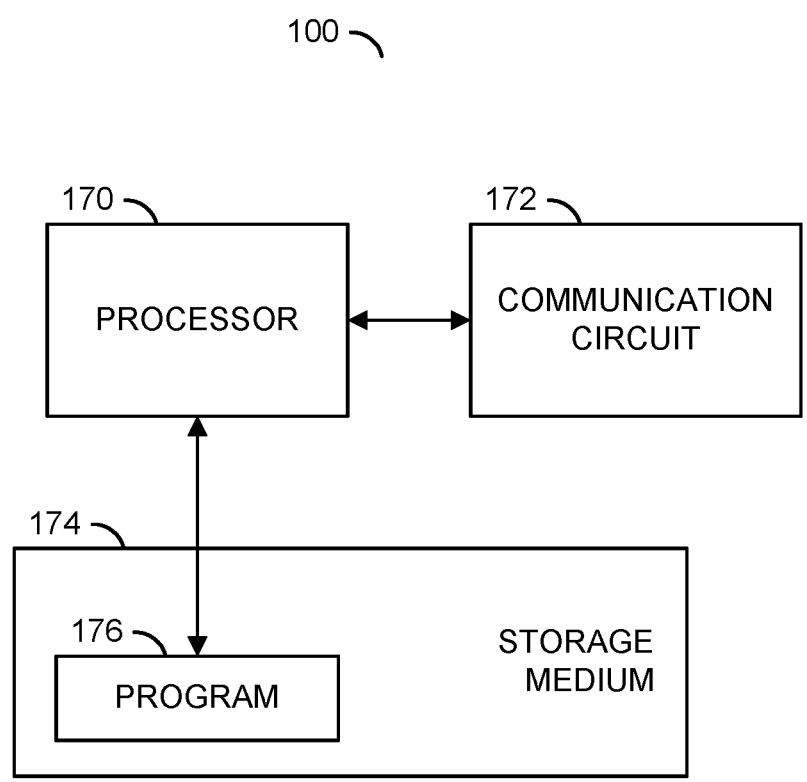
FIG. 5 is a diagram illustrating an implementation of a backup circuit in accordance with an example embodiment of the invention.

Referring to FIG. 5, a diagram illustrating an implementation of the backup circuit 100 is shown in accordance with an example embodiment of the invention. The backup circuit 100 generally comprises a block (or circuit) 170, a block (or circuit) 172 and a block (or circuit) 174. The circuits 170 to 174 may be implemented with hardware and/or with software executing on the hardware.

The circuit 170 may implement one or more processors. The processor 170 may be operational to execute software programs stored in the circuit 174. The processor 170 may also be in bidirectional communication with the circuit 172 to send and receive files, backup files and parts of the backup files to and from other circuitry external to the backup circuit 100.

The circuit 172 may implement a communication circuit. The communication circuit 172 is generally operational to send and receive data to and from other circuitry external to the backup circuit 100. In various embodiments, the communication circuit 172 may communicate with the backup server 82 and the read/write device 86. In other embodiments, the communication circuit 172 may communicate directly with the database 90 and the read/write device 86.

The circuit 174 may implement one or more non-transitory storage media. The storage medium 174 may store a software program 176. The software program 176 may define the steps that implement the backup technique performed by the backup circuit 100. The software program 176 may be read and executed by the processor 170.

Figure 6:
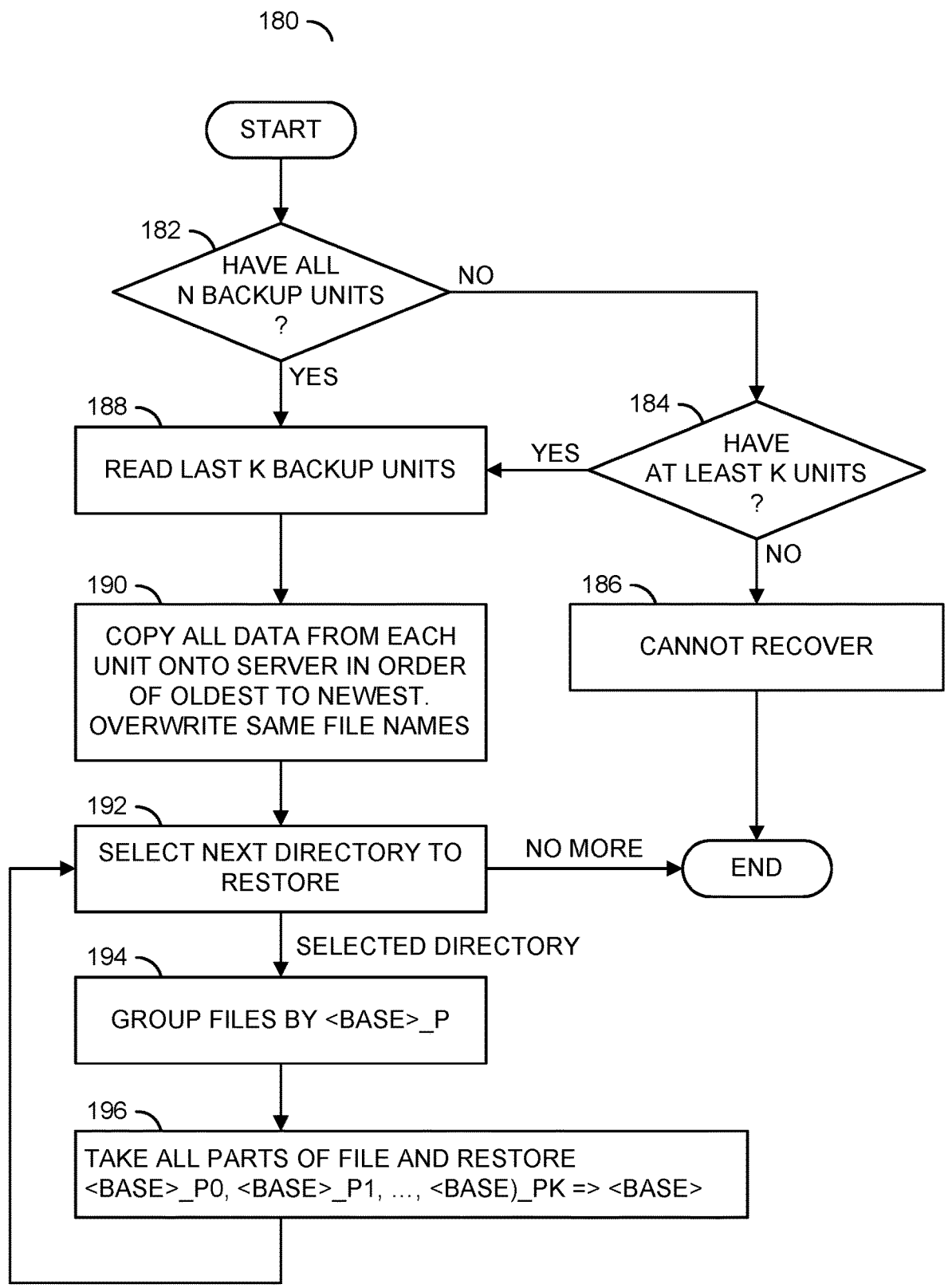
FIG. 6 is a diagram illustrating a method for restoring from a backup collection in accordance with an example embodiment of the invention.

Referring to FIG. 6, a diagram illustrating a method 180 for restoring from the backup collection 88 is shown in accordance with an example embodiment of the invention. The method (or process) 180 may be implemented by the backup circuit 100, the computer 84, the server computer 82 and the backup collection 88. The method 180 generally comprises a decision step (or state) 182, a decision step (or state) 184, a step (or state) 186, a step (or state) 188, a step (or state) 190, a step (or state) 192, a step (or state) 194 and a step (or state) 196. The sequence of the steps 182 to 196 is shown as a representative example. Other step orders may be implemented to meet the design criteria of a particular application.

In the decision step 182, the backup circuit 100 may determine if all of the appropriate backup media units 92a-92n are available to restore entire database 90. If not all of the media units 92a-92n are available, the backup circuit 100 may determine if at least the appropriate K media units 92a-92n are available. If the K media units 92a-92n are not available, the backup circuit 100 may indicate in the step 186 that the database 90 cannot be recovered.

If all of the media units 92a-92n, or at least the appropriate K media units 92a-92n are available, the backup circuit 100 and the read/write device 86 may read from the last (or most recent) K backup media units 92a-92n in the step 188. In the step 190, the backup circuit 100 may copy all the read data from each media unit 92a-92n into the server computer 82 in an order of oldest to newest. Newer files of the same name as older files already copied may be overwritten. For snapshots, if older versions of some files are desired, the older version of the files may be kept and not overwritten.

In the step 192, the backup circuit 100 may select a next current directory to restore. If no directories have been restored, the next directory may be an initial directory. If one or more directories remain to be restored, the next selected directory may become the current directory. In the step 194, the backup circuit 100 may group the file parts by directory <BASE>_P. The backup circuit 100 may take all parts of the files and restore the files by <BASE>_P0, then <BASE>_P1, and so one until the current directory has been restored. The method 180 may return to the step 192 to select the next directory to restore. Once all of the directories in the database 90 have been restored, the method 180 may end. In some cases, files may be deleted. For example, if no part associated with a given file exists on the most recent backup unit, the given file no longer exists and should be deleted.

Referring to FIG. 7, a diagram illustrating a method 220 for generating another backup is shown in accordance with an example embodiment of the invention. The method (or process) 220 may be implemented by the backup circuit 100, the read/write device 86 and the media units 92a-92n. The method 220 generally comprises a step (or state) 222, a step (or state) 224, a step (or state) 226, a step (or state) 228, a step (or state) 230, a decision step (or state) 232, a step (or state) 234, a step (or state) 236, a step (or state) 238 and a step (or state) 240. The sequence of the steps 222 to 240 is shown as a representative example. Other step orders may be implemented to meet the design criteria of a particular application.

In the step 222 a target media unit 92a-92n may be inserted into the media read/write device 86. The backup circuit 100 may select a next source directory in the database 90 in the step 224. If no source directories were previously selected, the next source directory may be an initial source directory. In the step 226, the backup circuit 100 may generate an empty action list 'A' of actions. In the step 228, the backup circuit 100 may generate a subdirectory list 'S' of all subdirectories in the current source directory. The steps 226 and 228 may be performed in parallel (as shown) or performed sequentially.

In the step 230, the backup circuit 100 may code a current file in the current source directory using the K-of-N coding to create the backup file. In the step 232, the backup circuit 100 may determine if less than N−K+1 backups of the current file exist in the backup collection 88, or if the current file is a small file that may easily be copied into the current media unit 92a-92n without the K-of-N coding. If less than N−K+1 backups have been made or the current file is small, the backup circuit 100 may add an action to the list 'A' in the step 234 to write the current file to the current media unit 92a-92n. The method 220 may return to the step 230 to code the next current file in the current source directory.

If at least N−K+1 backups of the file exist in the backup collection 88, the backup circuit 100 may add to the list 'A' an action to write a current part F of the backup version of the file to the directory <SOURCE>_F<F> of the current media unit 92a-92n in the step 236. The method 220 may return to the step 230 to code a next current file in the current source directory.

Once all of the files in the current source directory have been considered and the action list 'A' has been populated, the backup circuit 100 may continue the method 220 with the step 238. In the step 238, the backup circuit 100 may delete from the current target media unit 92a-92n all files not in the action list 'A'. The backup circuit 100 may also delete from the current target media unit 92a all subdirectories in the source directory not in the subdirectory list '5'. In the step 240, the backup circuit 100 may perform all of the actions in the action list 'A' to write the full files and/or parts of the backup files to the current media unit 92a-92n. The method 220 may return to the step 224 to select a next source directory. After all of the directories in the database 90 have been processed, the method 220 may end.

Figure 8:
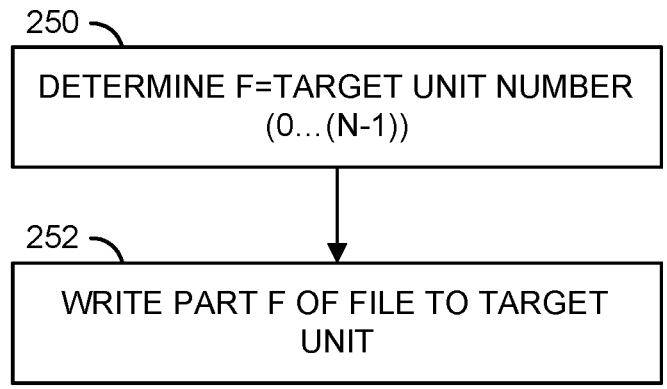
FIG. 8 is a diagram illustrating a method for selecting a target unit in accordance with an example embodiment of the invention.

Referring to FIG. 8, a diagram illustrating a method 152a for selecting a target unit is shown in accordance with an example embodiment of the invention. The method (or process) 152a may be a variation of the step 152 in the method 140. The method 152a generally comprises a step (or state) 250 and a step (or state) 252.

In the step 250, the circuit 100 may determine a target media unit 92a-92n to use in a current cycle 126 by matching the number (e.g., F) of the media unit (e.g., 92f) to the number of the current cycle 126 (e.g., CF). The current target media unit 92f may be loaded into the read/write device 86.

In the step 252, a current part 128 (e.g., F) of the backup file of the current file may be written into the current target media unit 92f. If all parts being backed up and all copies of the files being backed up fit on a single medium, the medium may remain in the read/write device 86 until the current cycle CF is complete. Otherwise, each individual medium of the media unit 92f may be replaced in the read/write device 86 with another medium of the media unit 92f as each medium approaches or becomes too full to accommodate the backup data. Afterwards, the media unit 92f may be returned to the safe storage.

Figure 9:
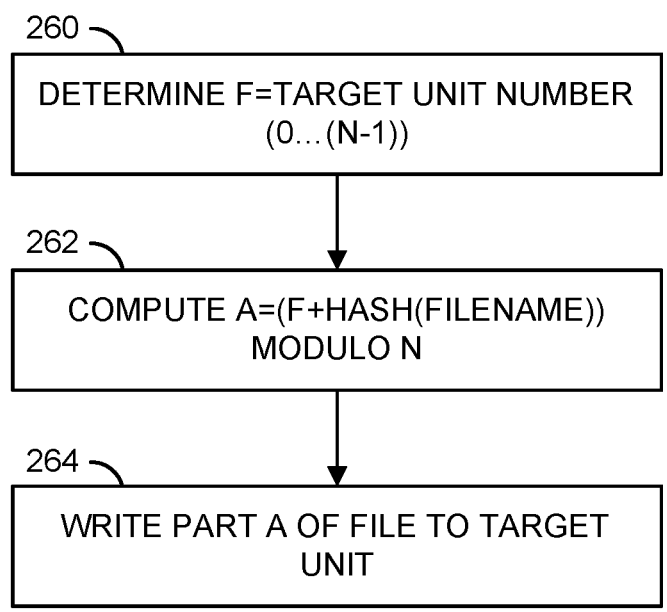
FIG. 9 is a diagram illustrating another method for selecting a target unit in accordance with an example embodiment of the invention.

Referring to FIG. 9, a diagram illustrating a method 152b for selecting a target unit is shown in accordance with an example embodiment of the invention. The method (or process) 152b may be a variation of the step 152 in the method 140. The method 152b generally comprises a step (or state) 260, a step (or state) 262 and a step (or state) 264.

In the step 260, the circuit 100 may determine a particular media unit 92a-92n to use in a current cycle 126 by matching the number (e.g., F) of the media unit (e.g., 92f) to the number of the current cycle 126 (e.g., CF). The selected current media unit 92f may be loaded into the read/write device 86.

In the step 262, the circuit 100 may compute a value A as a modulo N of a sum of (i) the value F of the current target media unit 92f and (ii) a hash of the current file name. The computed value A may subsequently be used in the step 264 to write the part A of the backup file to the current target media unit 92f. If all parts being backed up and all copies of the files being backed up fit on a single medium, the medium may remain in the read/write device 86 until the current cycle CF is complete. Otherwise, each individual medium of the media unit 92f may be replaced in the read/write device 86 with another medium of the media unit 92f as each medium approaches or becomes too full to accommodate the backup data. Afterwards, the media unit 92f may be returned to the safe storage.

In a general K-of-N coding case, a K×Z data matrix (D) may be multiplied by an N×K coding matrix (A) to create the N parts in an N×Z backup matrix (B). The matrix multiplication B=A×D may be provided by formula 1 as follows:

$$\begin{bmatrix} F_1 \\ F_2 \\ F_3 \\ \ldots \\ F_N \end{bmatrix} = \begin{bmatrix} W_1 \\ W_2 \\ W_3 \\ \ldots \\ W_N \end{bmatrix} \times \begin{bmatrix} D_1 \\ D_2 \\ D_3 \\ \ldots \\ D_N \end{bmatrix} \quad (1)$$

Where $W_1$ to $W_N$ may be the rows of the coding matrix A, $D_1$ to $D_N$ may be the rows of the data matrix D, and $F_1$ to $F_M$ may be the rows of the backup matrix B. Multiplying the N×K coding matrix A by the K×Z data matrix D generally produces the N×Z backup matrix B. Each of the N rows $F_1$ to $F_N$ in the backup matrix B may be one part of the coded backup file. Each of the rows $F_1$ to $F_N$ may be written to a different one of the media units 92a-92n. In practice, a single row $F_1$ to $F_N$ of the backup matrix B may be calculated in each cycle 126, rather than calculating all of the rows $F_1$ to $F_N$ of the backup matrix B at once. Furthermore, none of the rows $F_1$ to $F_N$ of the backup matrix B may match the rows $D_1$ to $D_N$ of the data matrix D and so may improve security for the data stored in the backup collection 88.

In a special K-of-N coding case, the K×Z data matrix D may be multiplied by an N×K coding matrix (A') to create the N parts in the N×Z backup matrix B. The matrix multiplication B=A'×D may be provided by formula 2 as follows:

$$\begin{bmatrix} D_1 \\ D_2 \\ D_3 \\ \cdots \\ D_K \\ C_1 \\ \cdots \\ C_{N-K} \end{bmatrix} = \begin{bmatrix} 1 & 0 & 0 & \cdots & 0 \\ 0 & 1 & 0 & \cdots & 0 \\ 0 & 0 & 1 & \cdots & 0 \\ \cdots & \cdots & \cdots & \cdots & \cdots \\ 0 & 0 & 0 & \cdots & 1 \\ -- & -- & W_{K+1} & -- & -- \\ -- & -- & W_{K+2} & -- & -- \\ & & \cdots & & \\ -- & -- & W_N & -- & -- \end{bmatrix} \times \begin{bmatrix} D_1 \\ D_2 \\ D_3 \\ \cdots \\ D_N \end{bmatrix} \quad (5)$$

A top part of the coding matrix A' may be an identity matrix. Therefore, the first K parts of the backup matrix B may be the same as the first K parts of the original data matrix D. Using the special case, the first K parts of the backup matrix B may use modest computational resources (e.g., "easy") in the backup circuit 100. The remaining N-K parts may use more computational resources (e.g., "harder") in the backup circuit 100. While using the special case, the backup circuit 100 may rotate the parts $D_1$ to $C_{N-K}$ of the backup matrix B mapped to each media unit 92a-92n number. Therefore, the "easy" calculations may be spread across all of the media unit 92a-92n, rather than having media units 92a-92k being easy to calculate the parts, and the media units 92k+1 to 92n being harder to calculate the parts.

Figure 10:
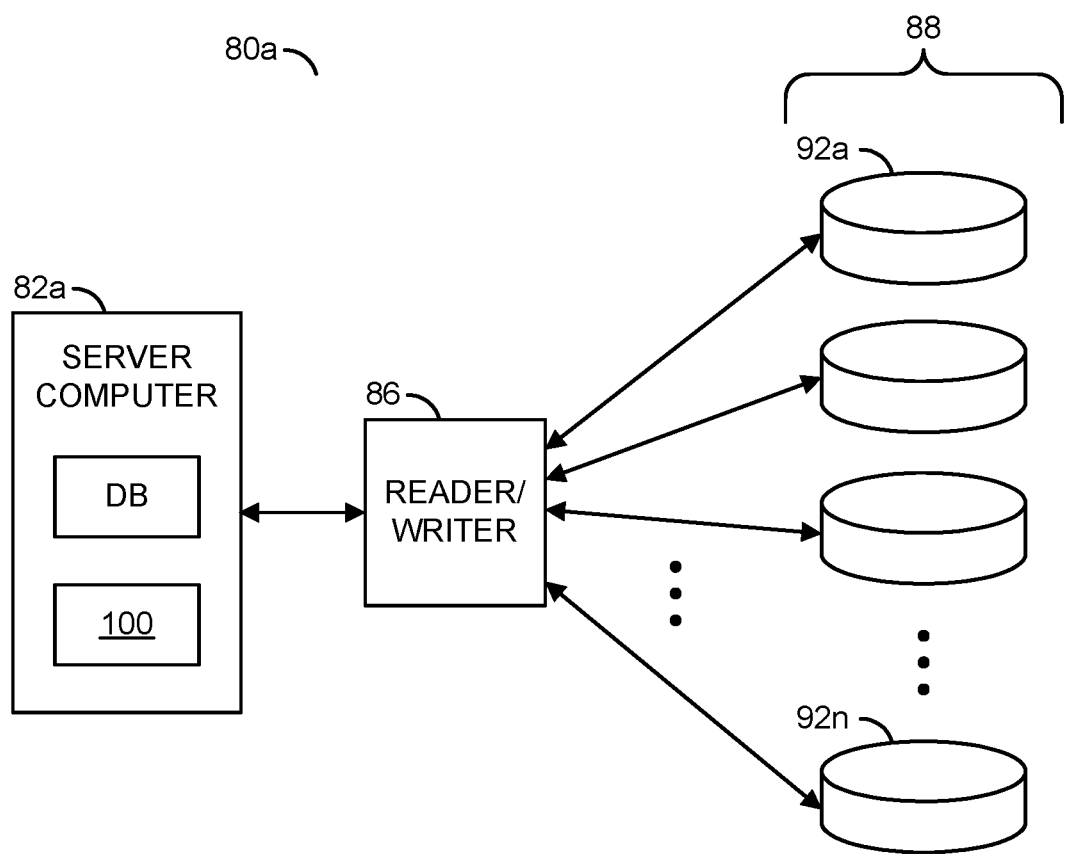
FIG. 10 is a diagram illustrating another system in accordance with an example embodiment of the invention.

Referring to FIG. 10, a diagram illustrating another system 80a is shown in accordance with an example embodiment of the invention. The system (or apparatus) 80a may be a variation of the system 80. The system 80a generally comprises a server computer 82a, the read/write device 86 and the media units 92a-92n in the backup collection 88. The server computer 82a may be a variation of the server computer 82. The backup circuit 100 may be included internal to the server computer 82a (e.g., the backup circuit 100 and the database 90 are in the same computer). The operations of the backup circuit 100, the server computer 82a, the read/write device 86 and the media units 92a-92n may be the same in the system 80a as in the system 80 with the server computer 82a performing the functions of the computer 84.

Various embodiments of the invention may provide a technique for writing a redundant backup set that includes writing for each file either the entire file, a portion of the file or some data derived from the entire file that is smaller in size that the file to each media unit in a set of backup media units such that only a subset of the backup media units are utilized to restore all the data that was present at the time of the last backup media unit in the subset. Each directory may store either the entire file or some smaller data derived from the file in such a way that multiple pieces of the smaller data may be used to restore the original file. The technique may combine the K-of-N coding to generate parts of a backup file with full backups of only certain files into the backup collection 88. A list of the files backed up may speed up the backup process and determine what files to process or how to process such files. Hash values of file paths, file names, file sizes, and file modification times may be used to determine whether files are new and how to treat the files. Hash values of the contents of the files may also be used to determine where and how to store the contents in the backup collection 88.

Various embodiments of the invention may provide a general method of implementing K-of-N coding that allows a file to coded into N parts (or pieces), of which any K parts may be used to recover the original file. The method may work the same with any finite field of size $2^{8*m}$ for m=1, 2, 4, 8.

Consider a case of a finite field with a size $2^8$ and a coding matrix A of size N×K (N rows and K columns). The coding matrix A may have elements in the finite field such that any K rows may be linearly independent. Taking K bytes at a time from an input data file D, let a vector X be the K bytes. A first byte C of the N parts to be dispersed may be computed by formula 3 as follows:

$$C = AX \quad (3)$$

To reconstruct the original data from K parts, a new matrix $A_c$ may be created by picking the rows from the coding matrix A that correspond to the specific parts available, and place the first byte of each part into a vector Y. The original vector X (initial K bytes) may be reconstructed by formula 4 as follows:

$$X = A_c^{-1} Y \quad (4)$$

Therefore, the entire input data file B may be reconstructed.

A number of techniques generally exist to choose the coding matrix A. In various embodiments, the coding matrix A may be a Vandermonde matrix. In other embodiments, the coding matrix A may be a Random matrix.

A Vandermonde matrix generally possesses several desirable properties. An example Vandermonde matrix version of the coding matrix A may be given by formula 5 as follows:

$$A = \begin{bmatrix} 0^0 & 0^1 & 0^2 & \cdots & 0^{m-1} \\ 1^0 & 1^1 & 1^2 & \cdots & 1^{m-1} \\ 2^0 & 2^1 & 2^2 & \cdots & 2^{m-1} \\ 3^0 & 3^1 & 3^2 & \cdots & 3^{m-1} \\ \cdots & & & & \\ (N-1)^0 & (N-1)^1 & (N-1)^2 & \cdots & (N-1)^{m-1} \end{bmatrix} \quad (5)$$

Where any element to the 0 power may be 1 (e.g., the first column is all 1's). The coding matrix A may be constrained to $(N+K) \leq 2^8$. The coding matrix A generally has any subset of K rows linearly independent. Recall in a Galois field $GF(2^8)$ that addition may be the same as subtraction, and the only multiplies are 0 or 1. Therefore, the coding matrix A may be reduced to a new coding matrix A' per formula 6 as follows:

$$A' = \begin{bmatrix} I \\ W \end{bmatrix} \quad (6)$$

Where I may be a K×K identity matrix, and W may be an (N-K)×K matrix. An advantage of the form of the coding matrix A' may be that the initial K coded bytes may be calculated quickly as the initial K coded bytes are just the original data bytes. The remaining (N-K) bytes may utilize (N-K)*K multiplications. Common parity drives may use a similar technique where some set of the data may be written as-is, and the check data may be written as some combination of the data. A true single parity calculation may be a row of all 1's, achieved by a simple XOR of all the data together. By making the first row of W be all 1's (or contain only 1's and 0's), the calculation for that row may be quick. Such an approach is used by some codes where N−K=2, and the last 2 rows may be made simple to calculate by any common technique.

Another way to produce the coding matrix A is to randomly select elements in the finite field for the coding matrix A and subsequently check for a linear independence property. The likelihood that a random matrix is suitable is high. Such technique may commonly be used in random network coding, where the matrix may be varied constantly over time. The row reduction may be used to make the random matrix easier for computation.

At reconstruction time, along with the retrieved data, the parts may be the rows of coding matrix A that were used to construct each part. If the coding matrix A is not constant for all time, the row of the coding matrix A used to construct the part may be utilized with the parts (or some metadata attached to the part) during the reconstruction. Putting aside security implications, a checksum, a cyclic redundancy check, or a hash of the original file contents with each part may be calculated, so that correct reconstruction may be verified. An additional property of the data dispersal technique is that the coding matrix A should have no rows with a single entry of 1 and the remaining entries of 0 to avoid information about the original data being leaked to someone who obtains a single piece of the data.

The functions performed by the diagrams of FIGS. 1-10 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. A method of implementing a backup process across redundant removable media, comprising the steps of:

selecting a current portion less than all of a database to add to a backup collection using a circuit, wherein (a) said backup collection comprises N units of said redundant removable media, (b) said backup process comprises N cycles, (c) each of said N units of said redundant removable media is written to during a corresponding one of said N cycles, and (d) N is an integer greater than two;

generating a backup file of a current file in said current portion of said database using a K-of-N coding process, wherein (a) K is an integer less than N, (b) said backup file has N parts, (c) said current file can be recovered from any K parts among said N parts of said backup file, and (d) each of said N parts of said backup file is written to a respective one of said N units of said redundant removable media during the corresponding one of said N cycles;

during each of said N cycles of said backup process, determining a number of existing parts of said N parts of said backup file of said current file in said backup collection;

when, in a current cycle, the number of existing parts of said N parts of said backup file of said current file in said backup collection is determined to be less than N−K+1 parts, writing a current part among said N parts of said backup file to a backup file section of a current unit of said N units of said redundant removable media of said backup collection corresponding to the current cycle, and writing a copy of said current file to a new file section of said current unit of said N units of said redundant removable media of said backup collection corresponding to the current cycle; and when, in the current cycle, the number of existing parts of said N parts of said backup file of said current file in said backup collection is determined to be greater than or equal to N−K+1, writing only said current part among said N parts of said backup file to said backup file section of said current unit of said N units of said redundant removable media of said backup collection corresponding to the current cycle.

2. The method according to claim 1, wherein (a) all of said database is selected over said N cycles, (b) said current portion of said database is selected in the current cycle of said N cycles, and (c) said current part of said backup file is written to said backup file section of said current unit corresponding to the current cycle.

3. The method according to claim 1, wherein said copy of said current file written to said new file section of said current unit of said N units of said redundant removable media of said backup collection is written to a separate directory from said current part among said N parts of said backup file.

4. The method according to claim 1, wherein said N parts of said backup file are written to said N units of said redundant removable media of said backup collection in said N cycles, and the method further comprises the steps of:
  generating a hash value of one or more of (i) a file path, (ii) a file name, (iii) a file size, (iv) a file modification time, (v) a file contents, or (vi) any combination thereof of said current file;
  storing said hash value of said current file in said database; and
  storing a tag under said hash value of said current file in said database in each of said N cycles.

5. The method according to claim 4, wherein the step of determining if the number of existing parts of said N parts of said backup file of said current file in said backup collection is less than N−K+1 parts comprises:
  counting a number of times said tag is stored in said database under said hash value; and
  determining if said number is less than N−K+1.

6. The method according to claim 1, further comprising the step of:
  reusing said current unit once each backup period of said database.

7. The method according to claim 1, wherein all of said current file is written in at most N−K+1 units of said redundant removable media of said backup collection.

8. The method according to claim 7, wherein said current file can be restored to said database from a single one of said N−K+1 units of said redundant removable media of said backup collection.

9. The method according to claim 1, wherein said current file can be restored to said database from said backup collection without using up to N−K units of said redundant removable media of said backup collection.

10. The method according to claim 1, further comprising the steps of:
  copying data from at least K units of said N units of said redundant removable media of said backup collection; and
  restoring said current file in said database using said data.

11. An apparatus comprising:
  a circuit configured to (i) select a current portion less than all of a database to add to a backup collection, wherein (a) said backup collection comprises N units of a redundant removable media, (b) a backup process comprises N cycles, (c) each of said N units of said redundant removable media is written to during a corresponding one of said N cycles, and (d) N is an integer greater than two, (ii) generate a backup file of a current file in said current portion of said database using a K-of-N coding process, wherein (a) K is an integer less than N, (b) said backup file has N parts, (c) said current file can be recovered from any K parts among said N parts of said backup file, and (d) each of said N parts of said backup file is written to a respective one of said N units of said redundant removable media during the corresponding one of said N cycles, and (iii) during each of said N cycles, determine a number of existing parts of said N parts of said backup file of said current file in said backup collection; and
  an interface to a write device configured to send commands to said write device to (i) write a current part among said N parts of said backup file to a backup file section of a current unit of said backup collection corresponding to a current cycle and write a copy of said current file to a new file section of said current unit of said N units of said redundant removable media of said backup collection in response to said backup collection having less than N−K+1 existing parts of said N parts of said backup file of said current file and (ii) write said current part among said N parts of said backup file to said backup file section of said current unit of said backup collection corresponding to the current cycle in response to said backup collection having at least said N−K+1 existing parts of said N parts of said backup file of said current file.

12. The apparatus according to claim 11, wherein said circuit and said database are indifferent computers.

13. The apparatus according to claim 11, wherein said circuit is in a same computer as said database.

14. The apparatus according to claim 11, wherein said N units of said redundant removable media comprise one or more of (i) a plurality of magnetic disks, (ii) a plurality of optical disks, (iii) a plurality of magnetic tapes, (iv) a plurality of online or cloud-based storage locations, or (v) any combination thereof.

15. A method for backing up a database across redundant removable media, comprising the steps of:
  selecting a current directory less than all of a plurality of source directories in a database to add to a backup collection using a circuit, wherein (a) said backup collection comprises N units of said redundant removable media, (b) backing up said database comprises N cycles, (c) each of said N units of said redundant removable media is written to during a corresponding one of said N cycles, and (d) N is an integer greater than two;
  generating a subdirectory list of all of a plurality of subdirectories in said current directory;
  generating a backup file of a current file in a given one of said plurality of subdirectories using a K-of-N coding process, wherein (a) K is an integer less than N, (b) said backup file has N parts, (c) said current file can be recovered from any K parts among said N parts of said backup file, and (d) each of said N parts of said backup file is written to a respective one of said N units of said redundant removable media during the corresponding one of said N cycles;
  during each of said N cycles, determining a number of existing parts of said N parts of said backup file of said current file in said backup collection;
  during a current cycle, adding to an action list a first action type to copy a current part among said N parts of said backup file to a backup file section of a current unit of said N units of said redundant removable media of said backup collection corresponding to the current cycle;
  when, during the current cycle, the number of existing parts of said N parts of said backup file of said current file in said backup collection is determined to be less than N−K+1 parts, further adding to said action list a second action type to copy said current file to a new file section of said current unit of said N units of said redundant removable media of said backup collection corresponding to the current cycle; and performing said action list to write one or both of (i) said current part of said backup file and (ii) a copy of said current file to said current unit of said N units of said redundant removable media of said backup collection corresponding to the current cycle.

16. The method according to claim 15, further comprising the step of:

reusing said current unit once each backup period of said database, wherein (a) said backup period comprises said N cycles, (b) all of said database is selected over said N cycles, (c) said current directory of said database is selected in the current cycle of said N cycles, and (d) said current part among said N parts of said backup file is written to said backup file section of said current unit in said current cycle.

17. The method according to claim 16, further comprising the step of:

deleting from said current unit all files not in said action list.

18. The method according to claim 16, further comprising the step of:

deleting from said current unit all files not in said subdirectory list.

19. The method according to claim 15, wherein said N units of said redundant removable media comprise one or more of (i) a plurality of magnetic disks, (ii) a plurality of optical disks, (iii) a plurality of magnetic tapes, (iv) a plurality of online or cloud-based storage locations, or (v) any combination thereof.

20. The method according to claim 19, wherein each of said N units of said redundant removable media comprises a different online or cloud-based storage location for redundancy.

* * * * *